Jan. 29, 1929.  1,700,428
J. L. BREESE, JR
THERMOSTATIC VALVE CONTROL
Filed April 8, 1927  2 Sheets-Sheet 1
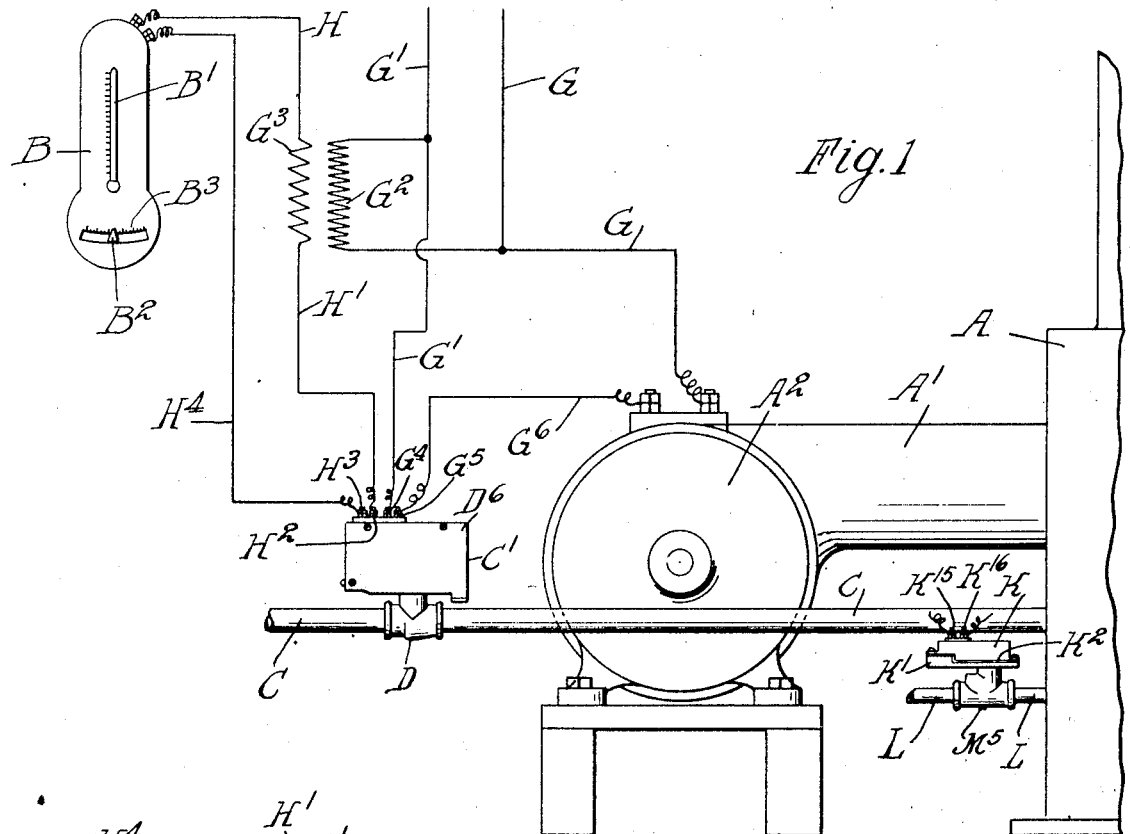
Fig.1
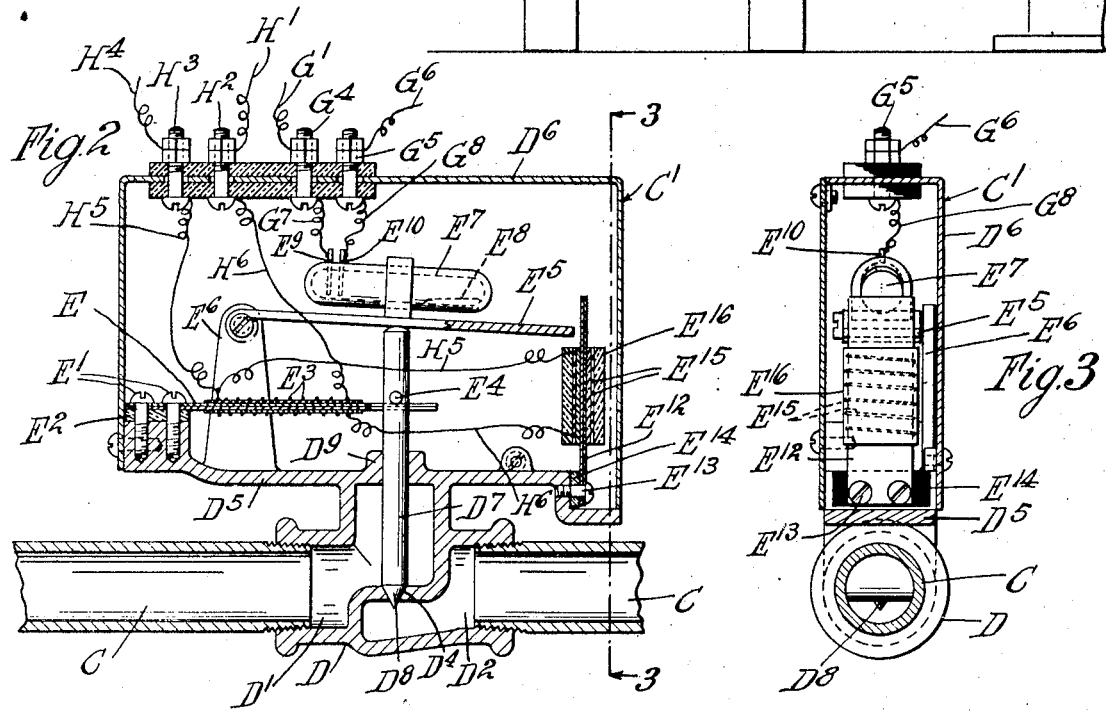
Fig.2
Fig.3
Inventor
James L. Breese, Jr
by Parker & Carter
Attorneys.

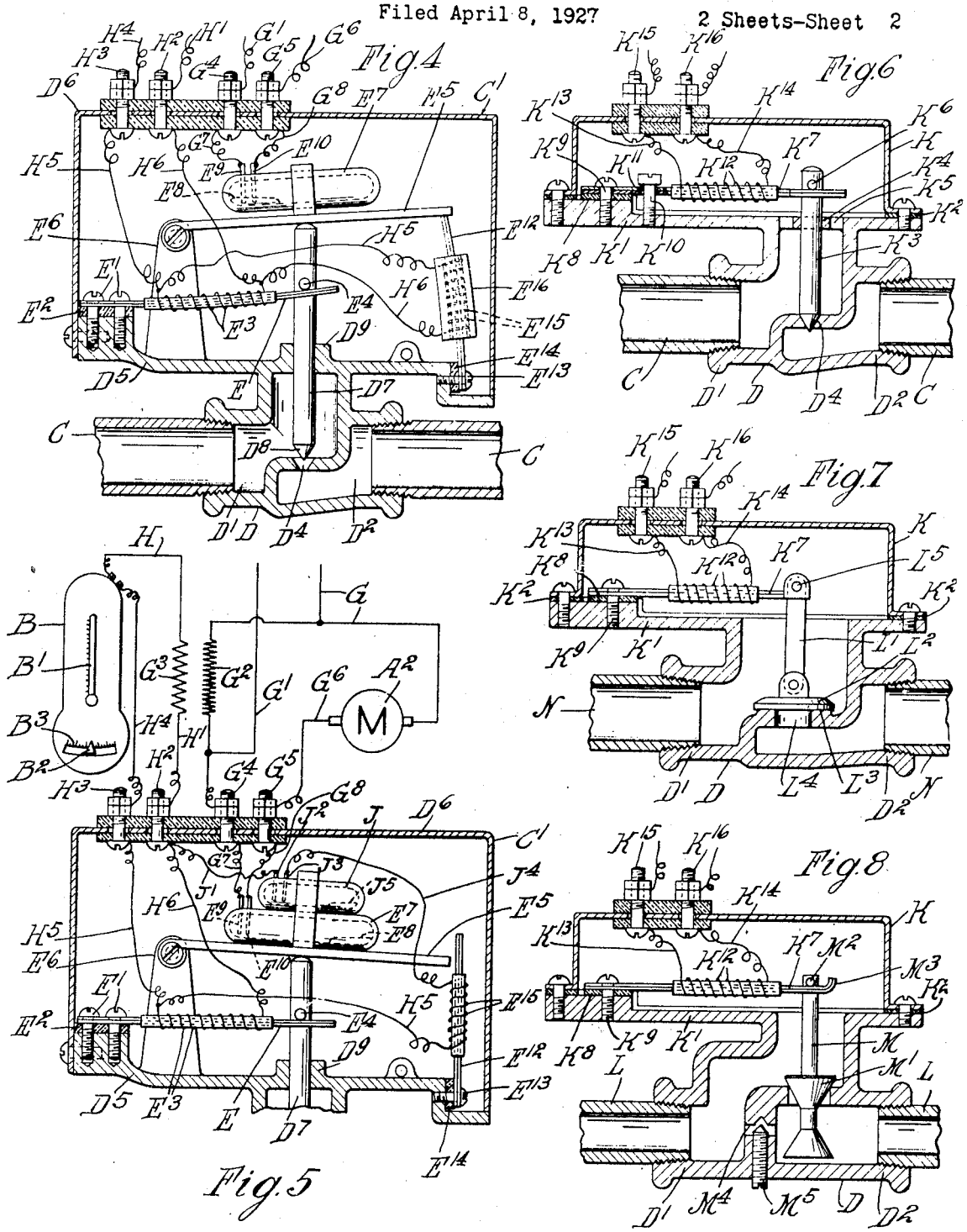

Patented Jan. 29, 1929.

1,700,428

UNITED STATES PATENT OFFICE.

JAMES L. BREESE, JR., OF CHICAGO, ILLINOIS, ASSIGNOR TO OIL DEVICES CORPORATION, OF CHICAGO, ILLINOIS, A CORPORATION OF ILLINOIS.

THERMOSTATIC VALVE CONTROL.

Application filed April 8, 1927. Serial No. 181,940.

My invention relates to a heating device and means for regulating it and has for particular purpose to provide an oil burning heating mechanism and a thermostatic regulation therefor. One object of my invention is to provide thermostatic control means for controlling the operation of the motor. Another object is the provision of thermostatic means for controlling the flow of fuel. Another object is the provision of means for controlling the flow of gas to the pilot light. Other objects will appear from time to time in the course of the specification and claims.

I illustrate my invention more or less diagrammatically in the accompanying drawings, wherein—

Figure 1 is a partial side elevation of my device, and includes a wiring diagram;

Figure 2 is a partial vertical section on an enlarged scale;

Figure 3 is a section on the line 3—3 of Figure 2;

Figure 4 is a section similar to Figure 2 with the parts in a different position;

Figure 5 is a sectional view similar to Figure 2 of a variant form of my device;

Figure 6 is a similar section of a variant form of my device;

Figure 7 is a vertical section through a gas valve; and

Figure 8 is a similar section through a variant form of gas valve shown in Figure 1.

Like parts are indicated by like symbols throughout the specification and drawings.

Referring first to Figure 1 A diagrammatically indicates a furnace and $A^1$ an air passage extending thereto. $A^2$ diagrammatically indicates a motor and motor operated fan whereby air may be forced through the passage $A^1$ to the combustion chamber of the furnace A.

B diagrammatically illustrates any suitable thermostatic device having associated with it the thermometer $B^1$ and the control finger $B^2$ adjustable along the graduated scale $B^3$.

C is any suitable fuel line having associated with it the valve and valve control means generally indicated as $C^1$ and shown in detail in Figures 2 and 4. Referring to such figures D is a valve housing having a fuel inlet side $D^1$ and a fuel outlet side $D^2$ separated by an intermediate partition including the horizontal portion $D^3$ which is penetrated by the valve aperture $D^4$. $D^5$ is a housing base mounted upon and herein shown as integral with the member D. Secured to it is a housing $D^6$. $D^7$ indicates a valve stem having a conic tube $D^8$ shaped to conform to the valve aperture $D^4$ and slidably mounted in the apertured boss $D^9$ of the member $D^5$.

I employ the valve controlling mechanism below described. E is any suitable bimetallic thermostatic leaf secured to the base $D^5$ as by the screws $E^1$ which draw it against the insulating base block $E^2$. $E^3$ is a resistance surrounding said bimetallic leaf E. $E^4$ is a pin or stud upon the valve stem $D^7$ which is adapted to be engaged by the thermostatic leaf E when it is upwardly flexed in response to temperature change when the resistance element $E^3$ becomes heated. In such case the valve stem $D^7$ is lifted by the flexing of the thermostatic leaf. The valve stem $D^7$ is normally held in closing position, as shown in Figure 2, by the lever $E^5$ pivoted to the arm support $E^6$ upwardly projecting from the member $D^5$. $E^7$ is a tube containing mercury $E^8$, the tube being provided with the contacts $E^9$ $E^{10}$. It will be realized that when the leaf E is flexed to raise the valve stem $D^7$ it also lifts the lever $E^5$ and causes the mercury $E^8$ to close the circuit through the contacts $E^9$ $E^{10}$.

$E^{12}$ is a second bimetallic leaf extending upwardly from the member $D^5$ to which it is secured by the screws $E^{13}$ and from which it is insulated by the block $E^{14}$. It is provided with a resistance member $E^{15}$ surrounded by an insulating jacket $E^{16}$.

Referring to the wiring diagram of Figure 1 the conductors G and $G^1$ are in circuit with any suitable source of electric power, for example city circuit of say, 110 volts. $G^2$ is the primary coil and $G^3$ the secondary coil of a transformer, the primary coil being across the lines G and $G^1$. It will be understood that the line G is in communication with the motor $A^2$ whereas the line $G^1$ extends to a contact $G^4$ in the top of the housing $D^6$. A second contact $G^5$ thereon is connected to the motor $A^2$ by the conductive line $G^6$. $G^7$ and $G^8$ are conductors extending from the contacts $G^4$ and $G^5$ to the contacts $E^9$ and $E^{10}$, in the tube $E^7$. It will thus be realized that when the lever $E^5$ is raised by flexion of the bimetallic strip E, the 110 volt circuit is closed, whereby the motor $A^2$ is actuated.

The secondary coil $G^3$ is connected by the conductive line H with the thermostat B and by the line $H^1$ with the contact $H^2$ on the housing member $D^6$. A second contact $H^3$ on said housing is connected by the conductive line $H^4$ with the thermostat B. $H^5$ and $H^6$ are conductors extending from the terminals $H^3$ and $H^4$ respectively to the opposite ends of the resistance elements $E^3$ associated with the leaf E. The same conductors, or extensions thereof, extend to the opposite ends of the resistance element $E^{15}$ on the leaf $E^{12}$.

Referring to Figure 5 a variant form is illustrated in which in addition to the single mercury tube $E^7$ I employ an additional tube J. In this form the line $H^5$ continues on to the resistance member $E^{15}$ of the leaf $E^{12}$, from which the insulating sheath $E^{16}$, is omitted but the line $H^6$ terminates at the resistance member $E^3$ on the leaf E. An additional conductor $J^1$ extends from the terminal $H^2$ to the contact $J^2$ in the tube J. A second contact $J^3$ of said tube is connected with the resistance element $E^{15}$ of the leaf $E^{12}$ by a conductive line $J^4$. $J^5$ is a body of mercury in the tube J which closes the circuit for actuating the resistance member $E^{15}$ when the lever $E^5$ is lifted by the flexing of the leaf E.

Figure 6 illustrates another variation in which the fuel line valve is separately actuated from the thermostat irrespective of whatever control arrangements may be made for the motor, if a motor is used. This structure is also adaptable for use to control the fuel line L of Figure 1 which extends to the pilot light. It will be realized that the pilot light control may be actuated directly from the thermostat, or may be actuated by any suitable switch, thermostatic or otherwise which may, for example, be controlled by actuation of the motor. The details of such connections are not illustrated, since they do not per se form part of the present invention. A smaller housing K is employed, mounted upon a base $K^1$ and insulated from it as by the insulating strip $K^2$. $K^3$ is a valve stem passing through the spider $K^4$ which is ported as at $K^5$ to permit a flow of fuel into the interior of the housing K. $K^6$ is a pin or lug adjacent the upper end of the valve stem $K^3$ and is adapted to be engaged by the bimetallic thermostatic strip $K^7$. The strip $K^7$ is mounted upon the insulating block $K^8$ and is secured to the base $K^1$ by the screw $K^9$ passing therethrough. $K^{10}$ is a limit member, herein shown as a headed screw passing through an aperture $K^{11}$ in the leaf $K^7$. $K^{12}$ is a resistance member about the thermostatic leaf $K^7$ which is connected by the conductors $K^{13}$ and $K^{14}$, with the terminals $K^{15}$ and $K^{16}$ respectively. The terminals in turn are connected in any suitable manner with a thermostat of any suitable type.

Figure 7 illustrates a gas control valve for use for example with a gas line N which extends to any suitable gas burner. It differs from the structure of Figure 6 primarily in the substitution for the valve stem $K^3$ of a link $L^1$ and flat valve member $L^2$ pivoted at the lower end thereof and adapted to abut against flat bearing surfaces $L^3$ surrounding the gas valve aperture $L^4$. The link $L^1$ is pivoted at its upper end, as at $L^5$, to the outer end of the bimetallic strip $K^7$.

Figure 8, like Figure 7, indicates a gas valve control particularly adaptable for use in controlling the pilot light line L, shown in Figure 1. M indicates a valve controlling stem to the lower end of which is a valve member $M^1$ of hour glass form. The stem M is provided with a pin or lug $M^2$ adapted to be upon the upper surface of the leaf $K^7$. The outer end of the leaf is upwardly curved as at $M^3$ in order to prevent displacement of the stem M. $M^4$ is a bypass adapted to be controlled by the valve screw $M^5$.

It will be realized that whereas I have described and shown a practical and operative device nevertheless many changes may be made in disposition of parts without departing from the spirit of my invention. I therefore wish my drawings and description to be taken as in a broad sense illustrative and diagrammatic rather than as limiting me to my specific showing. I wish it further to be understood that the control means herein shown, including for example the thermostatic leaf and means for heating it, as applied to a valve control, is claimed per se in a co-pending application, No. 191,296.

The use and operation of my invention are as follows:

In employing an oil burning device of the type generally illustrated in Figure 1 it is customary to provide a forced air supply, a main fuel supply, and a pilot light fuel supply. Oil burners of this type are prevailingly intermittent in operation, the forcing mechanism, motor or the like, being thermostatically controlled. Thus a thermostat is set at a given normal and when the temperature surrounding the space about the thermostat is at or about such normal, the air supply and the main fuel supply are inactive and only the pilot light is actuated. When the temperature drops beneath said normal and a drop of a degree or two is generally necessary, the thermostat is actuated thereby. In the particular device described herein such thermostatic actuation closes the circuit through the conductors H $H^1$ and $H^4$ and thus through the resistance members $E^3$ and $E^{15}$, the current being supplied by the secondary coil $G^3$ of the transformer. Referring to Figures 2 and 3 it will be noted that the resistance member $E^3$ has less mass to be heated than the member $E^{15}$ and the result is a rapid flexure of the leaf E which engages the pin $E^4$ and lifts the valve stem $D^7$, thus permitting a flow of fuel along the line C. As the stem $D^7$ rises it rotates the lever $E^5$ about its pivot and carefully tilts the tube $E^7$ sufficiently to cause the mercury $E^8$ to close the circuit between the contacts $E^9$ and $E^{10}$. As earlier pointed out, such tilting of the tube $E^7$ closes the motor circuit, and the motor is actuated. The leaf $E^{12}$ is also flexed, although somewhat more slowly in order to prevent binding of the outer end of the lever $E^5$, and when flexed it takes the position shown in Figure 4. As long as the thermostat B is actuated current is supplied to all of the above circuits. The motor delivers the necessary supply of air and the fuel valve passes the necessary supply of fuel.

When the room temperature rises to above the predetermined normal, then the circuit through the conductors H, $H^1$ and $H^4$ is broken and the resistance elements $E^3$ and $E^{15}$ are no longer actuated. The leaf E rapidly falls to the position in which it is shown in Figure 2 but the leaf $E^{12}$, since it is surrounded by an insulating jacket $E^{16}$, loses its heat less rapidly and does not move into release position until after a perceptible lapse of time. The result is that the motor continues to deliver the air necessary for completion of the combustion of the fuel already supplied. Whereas an excess of air, or prolongation of air supplied is harmless, a prolongation of the fuel supply after the air is cut off would be damaging, as liquid hydrocarbon would be allowed to accumulate in the burner.

In the form of Figure 5 the insulating jacketing of the resistance element $E^{15}$ is omitted and in the place of the single tube $E^7$ two tubes are employed. The general variation of the device is identical, but all binding between the lever $E^5$ and the leaf $E^{12}$ is rendered impossible, since the resistance element $E^{15}$ is not actuated until the mercury $J^5$ in the tube J closes its circuit and this does not happen until the lever $E^5$ has been lifted above the end of the leaf $E^{12}$.

Figures 6, 7 and 8 illustrate valves which may be employed to control either a main fuel supply or a pilot light. It is desirable that a constant and predetermined minimum combustion be maintained in a pilot light structure. It is also desirable that when the burner is actuated an excess of fuel is supplied to the pilot light in order that the pilot light may aid in the initial heating of the main fuel supply. It will be realized that when the structures of Figures 6, 7 and 8 are employed in pilot light control they may all be provided with a bypass such as is shown at $M^4$ in Figure 8. In such case the bypass provides the minimum fuel supply necessary, whether of gas or of oil and the maximum is provided by the actuation of the thermostatic leaf $K^7$, by the heating of the resistance element $K^{12}$. The resistance element may be actuated directly from the thermostat B or intermediately through any suitable switch connection with the motor.

I claim:

1. The combination with a heating device having a blower and a fuel line, of a valve in said fuel line, a thermostatic leaf adapted to actuate said valve, a motor for said blower, an actuating electric circuit therefor and means for closing said circuit in response to actuation of said valve.

2. The combination with a heating device having a blower and a fuel line, of a valve in said fuel line, a thermostatic leaf adapted to actuate said valve, a motor for said blower, an actuating electric circuit therefor and means for closing said circuit in response to actuation of said valve, comprising a mercury tube adapted to be moved into circuit closing position in response to movement of said valve.

3. The combination with a heating device having a blower and a fuel line and a thermostat, of a valve in said fuel line, a thermostatic leaf adpated to actuate said valve, a resistance member about said thermostatic leaf and an actuating circuit therefor adapted to be actuated by said thermostat, an actuating electric circuit for said blower and means for closing said blower circuit in response to actuation of said thermostatic leaf.

4. The combination with a heating device having a blower and a fuel line and a thermostat, of a valve in said fuel line, a thermostatic leaf adapted to actuate said valve, a resistance member about said thermostatic leaf and an actuating circuit therefor adapted to be actuated by said thermostat, an actuating electric circuit for said blower and means for closing said blower circuit in response to actuation of said thermostatic leaf, including a lever adapted to be rotated by the movement of said valve in response to the actuation of the thermostatic leaf and a circuit closing member mounted upon said lever.

5. The combination with a heating device having a blower and a fuel line and a thermostat, of a valve in said fuel line, a thermostatic leaf adapted to actuate said valve, a resistance member about said thermostatic leaf and an actuating circuit therefor adapted to be actuated by said thermostat, an actuating electric circuit for said blower and means for closing said blower circuit in response to actuation of said thermostatic leaf, including a lever adapted to be rotated by the movement of said valve in response to the actuation of the thermostatic leaf and a circuit closing member mounted upon said lever, and means, independent of the valve, for holding said lever in circuit closing position.

6. The combination with a heating device having a blower and a fuel line and a thermostat, of a valve in said fuel line, a thermostatic leaf adapted to actuate said valve, a resistance member about said thermostatic leaf and an actuating circuit therefor adapted to be actuated by said thermostat, an actuating electric circuit for said blower and means for closing said blower circuit in response to actuation of said thermostatic leaf, including a lever adapted to be rotated by the movement of said valve in response to the actuation of the thermostatic leaf and a circuit closing member mounted upon said lever, and means, independent of the valve, for holding said lever in circuit closing position, comprising a secondary thermostatic leaf and a resistance member associated therewith.

7. The combination with a heating device having a blower and a fuel line and a thermostat, of a valve in said fuel line, a thermostatic leaf adapted to actuate said valve, a resistance member about said thermostatic leaf and an actuating circuit therefor adapted to be actuated by said thermostat, an actuating electric circuit for said blower and means for closing said blower circuit in response to actuation of said thermostatic leaf, including a lever adapted to be rotated by the movement of said valve in response to the actuation of the thermostatic leaf and a circuit closing member mounted thereupon, and independent means for holding said lever in circuit closing position comprising a secondary thermostatic leaf and a resistance member associated therewith, and a second circuit closing member therefor mounted upon said lever.

8. The combination with a heating device having a blower and a fuel line and a thermostat, of a valve in said fuel line, a thermostatic member adapted to actuate said valve, a resistance member associated therewith, an actuating circuit for said resistance member adapted to be closed by said thermostat, an actuating electric circuit for said blower, and means for closing said blower circuit in response to actuation of said thermostatic member.

9. The combination with a heating device having a blower and a fuel line and a thermostat, of a valve in said fuel line, a thermostatic member adapted to actuate said valve, a resistance member associated therewith, an actuating circuit for said resistance member adapted to be closed by said thermostat, an actuating electric circuit for said blower, and means for closing said blower circuit in response to actuation of said thermostatic member, including a lever and a circuit closing member positioned thereupon and adapted to be actuated by the change in inclination of said lever.

10. The combination with a heating device having a blower and a fuel line and a thermostat, of a valve in said fuel line, a thermostatic member adapted to actuate said valve, a resistance member associated therewith, an actuating circuit for said resistance member adapted to be closed by said thermostat, an actuating electric circuit for said blower, and means for closing said blower circuit in response to actuation of said thermostatic member, including a lever and a circuit closing member positioned thereupon and adapted to be actuated by the change in inclination of said lever, and means for holding said lever in circuit closing position which include a supplemental thermostatic member, and means for flexing said supplemental member subsequent to the flexing of the valve controlling thermostatic member.

11. The combination with a heating device having a blower and a fuel line and a thermostat, of a valve in said fuel line, a thermostatic member adapted to actuate said valve, a resistance member associated therewith, an actuating circuit for said resistance member adapted to be closed by said thermostat, an actuating electric circuit for said blower, and means for closing said blower circuit in response to actuation of said thermostatic member, including a lever and a circuit closing member positioned thereupon and adapted to be actuated by the change in inclination of said lever, and means for holding said lever in circuit closing position for a predetermined period subsequent to the release of said first mentioned thermostatic member from valve actuating position.

12. The combination with a heating device having a blower and a fuel line and a thermostat, of a valve in said fuel line, a thermostatic member adapted to actuate said valve, a resistance member associated therewith, an actuating circuit for said resistance member adapted to be closed by said thermostat, an actuating electric circuit for said blower, and means for closing said blower circuit in response to actuation of said thermostatic member, including a circuit making and breaking mercury tube adapted to be tilted in response to the actuation of said valve.

13. The combination with a heating device having a blower and a fuel line and a thermostat, of a valve in said fuel line, a thermostatic member adapted to actuate said valve, a resistance member associated therewith, an actuating circuit for said resistance member adapted to be closed by said thermostat, an actuating electric circuit for said blower, and means for closing said blower circuit in response to actuation of said thermostatic member, and means for supplying current to the actuating circuit for said resistance member which include a transformer the primary coil of which is in the blower circuit and the secondary coil of which is in said resistance member actuating circuit.

Signed at Chicago, county of Cook, and State of Illinois, this 1st day of April, 1927.

JAMES L. BREESE, Jr.